US009892537B2

(12) United States Patent
Paris et al.

(10) Patent No.: US 9,892,537 B2
(45) Date of Patent: Feb. 13, 2018

(54) SEAMLESS COMPOSITING USING A SOFT SELECTION

(71) Applicant: ADOBE SYSTEMS INCORPORATED, San Jose, CA (US)

(72) Inventors: Sylvain Paris, Jamaica Plain, MA (US); Sohrab Amirghodsi, Seattle, WA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/646,509

(22) Filed: Jul. 11, 2017

(65) Prior Publication Data

US 2017/0309053 A1    Oct. 26, 2017

Related U.S. Application Data

(63) Continuation of application No. 14/935,921, filed on Nov. 9, 2015, now Pat. No. 9,741,144.

(51) Int. Cl.
| | |
|---|---|
| *G06K 9/34* | (2006.01) |
| *G06T 11/60* | (2006.01) |
| *G06T 7/12* | (2017.01) |
| *G06K 9/62* | (2006.01) |
| *G06K 9/46* | (2006.01) |

(52) U.S. Cl.
CPC ............ *G06T 11/60* (2013.01); *G06K 9/4604* (2013.01); *G06K 9/6215* (2013.01); *G06T 7/12* (2017.01); *G06T 2207/20112* (2013.01)

(58) Field of Classification Search
CPC ........... G06T 3/40–3/4038; G06T 5/00–5/005; G06T 7/10–7/194; G06T 11/00–11/001; G06T 11/40–11/80; G06T 15/00; G06T 15/04; G06T 15/503; G06T 15/60–15/87; G06T 2200/32; G06T 2207/20141; G06T 2207/20152; G06T 2207/20172–2207/20192; G06T 2207/20204; G06T 2207/20212; G06T 2207/20221; G06T 2207/20224; G06K 9/00228; G06K 9/342; G06K 9/40; G06K 9/44; G06K 9/4604; G06K 9/4609; G09G 2320/0266; G09G 2340/12; G06F 3/0484–3/0486
See application file for complete search history.

(56) References Cited

U.S. PATENT DOCUMENTS

| | | | |
|---|---|---|---|
| 7,512,274 | B2 | 3/2009 | Simard et al. |
| 8,380,005 | B1 | 2/2013 | Jonsson |
| 8,571,326 | B2 | 10/2013 | Pettigrew et al. |
| 8,605,940 | B1 | 12/2013 | Wilensky |

(Continued)

OTHER PUBLICATIONS

"Adobe® Photoshop® CC Help", Adobe Systems Incorporated, Jun. 15, 2015, 864 pages (see, for example, pp. 464-472 and other instances of the phrase "healing brush" and the word "heal").

*Primary Examiner* — Jose Couso
(74) *Attorney, Agent, or Firm* — Finch & Maloney PLLC

(57) ABSTRACT

A healing component that heals foreground pixels with background pixels is provided. In some embodiments, the healing component is programmed or otherwise configured to respond to a single healing request by identifying a plurality of regions within a selected area and healing each region of the plurality of regions independently of other regions.

20 Claims, 5 Drawing Sheets

(56) References Cited

U.S. PATENT DOCUMENTS

| | | |
|---|---|---|
| 8,780,135 B2 | 7/2014 | Paris |
| 9,036,909 B2 | 5/2015 | Paris et al. |
| 9,111,389 B2 | 8/2015 | Nguyen et al. |
| 9,355,469 B2 | 5/2016 | Tighe et al. |
| 9,535,599 B2 | 1/2017 | Kim |
| 2013/0067380 A1 | 3/2013 | Pettigrew et al. |
| 2015/0293672 A1 | 10/2015 | Crotty et al. |
| 2016/0133027 A1 | 5/2016 | Zhao et al. |
| 2016/0140699 A1 | 5/2016 | Dhawan et al. |
| 2017/0132819 A1* | 5/2017 | Paris ................ G06T 11/60 |

* cited by examiner

SEAMLESS COMPOSITING USING A SOFT SELECTION

RELATED APPLICATIONS

This application claims benefit under 35 U.S.C. § 120 as a continuation of U.S. patent application Ser. No. 14/935,921, titled "SEAMLESS COMPOSITING USING A SOFT SELECTION", filed on Nov. 9, 2015, which is hereby incorporated herein by reference in its entirety.

FIELD OF THE DISCLOSURE

This disclosure relates to techniques of editing content, and more particularly, to techniques of generating composite images.

BACKGROUND

The software industry has developed numerous programs that allow users to generate or edit various types of content. This content may include drawings, images, video, text, and the like. The programs provide many benefits in generating and editing content. For example, image editing programs enable users to create new images or alter existing images. User-initiated changes to these images may include adding shapes, adding text, numbers, or other symbols, and shading, blurring, or filtering features of an image. Some content editing programs include tools that enable a user to generate composite images by combining one or more images or image portions into a single image (e.g., such as the selection, cropping, and retouching tools provided in Adobe® Photoshop®).

Using these tools, a user can select a portion of an image and place a copy of the portion within the same image or another image. The user can further crop or otherwise adjust the size or shape of the portion to achieve a desired effect. In some situations, the user may wish to modify the portion with the image so that transitions between the portion and the image are less noticeable. For example, a user may want to remove an object from the image by overwriting the object with a copy of a portion of the image background and blending away any visible transitions. This sort of operation may be accomplished using, for example, a "healing brush" (e.g., such as the healing brush tool provided in Adobe® Photoshop®). To use a healing brush tool, the user must first select a set of foreground pixels that will be applied by the healing brush tool during its operation. The set of foreground pixels may be selected from an image being retouched or a different image. While applying the set of foreground pixels to an image, the healing brush tool matches the texture, lighting, transparency, and shading of the foreground pixels to that of the background pixels in the image. As a result, the applied pixels blend seamlessly into the image.

However, such healing brush tools can suffer from various issues, depending on the image being modified. Such issues may be exacerbated when the healing brush tools are used in conjunction with a so-called "soft selection." A soft-selection generally refers to a selection where one or more pixels within a selected area are only partially selected. Partially selected pixels are still subject to actions executed on the selected area (e.g., a "healing" action), but partially selected pixels are affected by these actions to a lesser extent than fully selected pixels. For example, if an action changes the color of a selected area to blue, fully selected pixels change completely to the color of blue, but partially selected pixels change to the color of blue only to the extent of their selection. Thus, in one such example case, a pixel that is 50% selected changes 50% toward the color of blue.

DETAILED DESCRIPTION

Techniques are disclosed herein for compositing a set of foreground pixels with background pixels in a manner that prevents and/or limits unrealistic distortions associated with conventional healing brush tools. In various embodiments, a healing component is provided that is programmed or otherwise configured to respond to a single healing request by identifying a two or more of regions within a selected area and healing each identified region independently of other regions. By doing so, the healing component prevents starkly contrasting pixels in one region from affecting pixels in other regions. These techniques are especially well suited for use with soft selections, as soft selections can make it difficult for users to fully understand which pixels are part of a selected area and which pixels are not part of the selected area.

General Overview

Figure 5:
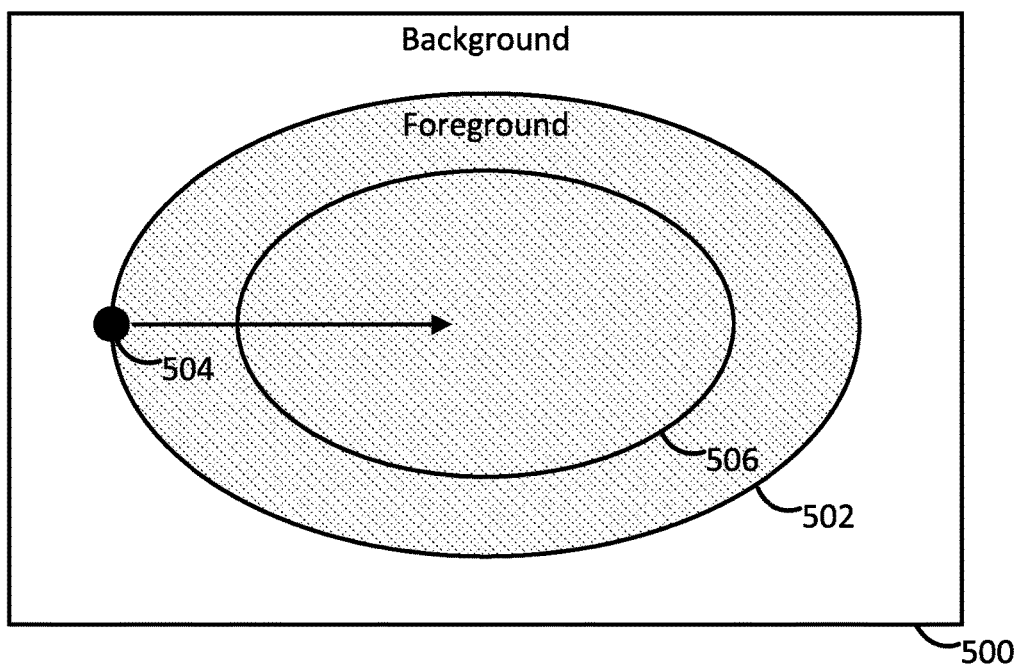
FIG. 5 is an illustration of an image being retouched by a conventional healing brush tool.

Conventional healing tools provide users with the ability to remove blemishes or undesirable features of an image. However, as previously noted, such tools suffer from disadvantages, depending on the image being modified. For example, applying a conventional healing tool to an area of an image that includes starkly contrasting pixels may produce unrealistic results. FIG. 5 illustrates an example image that is not amenable to conventional healing. As shown, FIG. 5 illustrates a portion of an image including a background 500, a foreground 502, a high contrast area 504 (a black dot, in this example case), and a visual cue 506 indicating a selection of content targeted for some editing action. The foreground 502 may include, for example, a set of foreground pixels that a user wishes to overlay upon the background 500 to effectively remove an object (e.g., a blemish) depicted in the background 500. In this example, the area of the background 500 that is covered by the foreground 502 is selected to be healed by modifying the selected area of the background 500 to incorporate properties of foreground pixels (e.g., pixels in the foreground 502). This selected area of the background 500 includes the high contrast area 504. Because the high contrast area 504 is included in the selected area, conventional healing tools may modify the image to yield an image that is not realistic or desirable.

For example, as illustrated by the arrow in FIG. 5, conventional healing tools propagate features of the high contrast area 504 into other areas of the background 500. For instance, where the high contrast area 504 is substantially darker than neighboring areas of the background 500 that are relatively near to the high contrast area 504, conventional healing tools may overly darken these neighboring areas. Additionally, conventional healing tools may make overcompensating adjustments in other areas of the background 500 due to the presence of the high contrast area 504. For instance, where the high contrast area 504 is substantially darker than most of the background 500, conventional healing tools may overly lighten areas relatively distant from the high contrast area 504.

These potential issues with conventional healing tools can cause unintended results where, for example, the conventional healing tools are used in conjunction with a soft selection, as previously explained. Where a soft selection is present (i.e., where at least one pixel is partially selected), a user interface typically displays a visual cue that depicts a boundary of the soft selection that includes pixels that are at least 50% selected. Thus where a soft selection is present, some pixels (e.g., those less than 50% selected) are typically depicted as being positioned outside the visual cue and, therefore, as being not selected. However, these partially selected pixels are still subject to processing by conventional healing tools, along with the rest of the selected area.

Returning to FIG. 5, the selected area of the background 500 covered by the foreground 502 may be a soft selection of the background 500 as described above. In this case, the visual cue 506 depicts the selected area and is displayed via pixels that are at least 50% selected. However, pixels positioned outside the visual cue 506 are also partially selected and therefore are subject to processing by a conventional healing tool. Where, as shown in FIG. 5, some pixels positioned outside the visual cue 506 include highly contrasting pixels (e.g., those pixels included in the high contrast area 504), users may unexpectedly encounter the conventional healing tool behavior described above. For example, as a practical matter, users often encounter this situation when attempting to heal faces of humans with relatively light skin and relatively dark hair because accidentally selecting a few pixels of dark hair is a common occurrence, especially where a soft selection is being used.

To address disadvantages of conventional healing tools, improved healing techniques are disclosed herein. Unlike existing healing techniques that may change images in an unexpected or otherwise non-intuitive manner, at some embodiments disclosed herein relegate instances of healing activity to particular portions of the image, thereby changing the image in more intuitive and expected manner. For instance, at least one embodiment disclosed herein executes multiple, distinct instances of a healing process in response to a single request to heal a selected area of an image. In this embodiment, each instance of the healing process composites foreground pixels with background pixels within a portion of the selected area to create a smoothly varying appearance in each portion. These embodiments may also blend each healed portion with the remainder of the image to reduce and/or remove any visible transitions. Thus, the techniques provided herein can be used to provide a more user friendly way for editing content, particularly when a user is attempting to generate a composite image using a soft selection.

To aid the reader's understanding of various example embodiments disclosed herein, some terminology used to describe these embodiments will now be presented. As used to herein, a healing component refers to, in addition to its ordinary meaning, a hardware and/or software component configured to heal a selected area of an image using sampled image data (e.g., foreground pixels). As used herein, to heal a selected area of an image refers to, in addition to its ordinary meaning, modifying the selected area to decrease the starkness of visual transitions within the selected area. As used herein, a selected area of an image refers to, in addition to its ordinary meaning, a set of pixels within an image targeted or otherwise identified for subsequent processing. Areas may be subdivided into regions. As used herein, a visual cue refers to, in addition to its ordinary meaning, a set of pixels displayed to indicate a feature (e.g., a selected area) of an image. As used herein, an interpolation process refers to, in addition to its ordinary meaning, a healing process in which differences between one or more foreground pixels and one or more pixels in a background area of an image are incorporated into the background area. As used herein, a boundary refers to, in addition to its ordinary meaning, a set of pixels having commonality with one another that are adjacent to at least one other pixel not sharing the commonality.

In accordance with some embodiments of the present disclosure, a healing component that heals an image is provided. In some embodiments, the healing component is implemented by and within a programmable device, which in turn may be part of a larger distributed computing system. For instance, the healing component may be a part of a content editing program and system that enables users to modify images by changing data descriptive of the images. The editing system may be implemented, for example, as a desktop application locally installed into a computer system (e.g., desktop, laptop, tablet, etc), or in the context of a client-server arrangement where the editing system is offered as part of a cloud-based service accessible from a server to a client computer via a network.

In some embodiments, the healing component is programmed or otherwise configured to respond to a single healing request by identifying a plurality of regions within an area selected for healing and healing each region of the plurality of regions independently of other regions of the plurality of regions. When executing according to one such embodiment, the healing component responds to a healing request by identifying a selected area of an image. The selected area may be, for example, a soft selection within the image. In one embodiment, the healing component identifies a first portion of the selected area that has pixels with a degree of selection greater than or equal to a threshold value and/or that are displayed within a visual cue of the selected area. In this embodiment, the healing component also identifies a second portion of the selected area that has pixels with a degree of selection less than the threshold value and/or that are not displayed within the visual cue. As described above, when a soft selection is present, some pixels may be positioned outside the visual cue but still subject to actions performed on the selected area. These pixels would fall within the second portion of the selected area introduced above. Thus, any adverse impact of these pixels (outside the visual cue) on the healing action can be limited or otherwise better contained. In some such embodiments, the healing component is programmed or otherwise configured to heal, in isolation from other healing activities, the background area in the first portion using the foreground pixels. Similarly, in these embodiments, the healing component is programmed or otherwise configured to heal, in isolation from other healing activities, the background area in the second portion using the foreground pixels. When executing according to these configurations, the healing component computes differences between the foreground pixels and background pixels that are part of a boundary (e.g., the visual cue) between the first portion of the selected area and the second portion of the selected area and modifies the background area of each portion, in isolation, to smoothly incorporate the differences. Next, the healing component executes an alpha blending process that blends the healed selected area with the remainder of the image. As a result, the healing component of such an embodiment is able to localize any unintended effect of highly contrasting pixels to particular portions of an area selected for healing.

Numerous other aspects, embodiments and advantages for compositing and healing applications will be apparent in light of this disclosure. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

System Architecture

Figure 1:
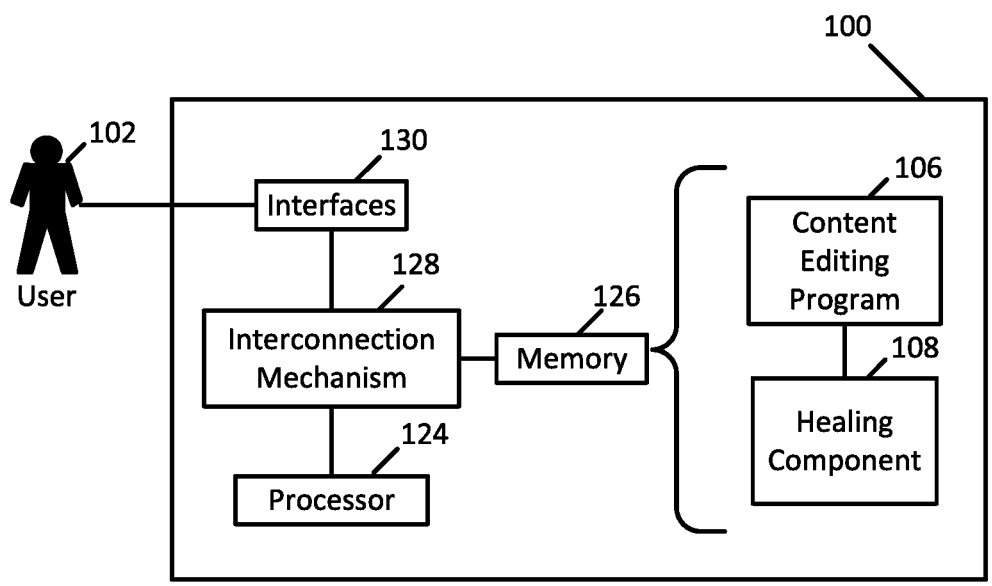
FIG. 1 is a block diagram illustrating an example content editing device in accordance with one or more embodiments of the present disclosure.

Various embodiments disclosed herein implement a healing component within one or more programmable devices. These programmable devices may include any device that processes information. Examples of common programmable devices include personal computers, workstations, servers, cellular telephones, and personal digital assistants. FIG. 1 illustrates one example in accord with some of the embodiments disclosed herein, a content editing device 100. As shown in FIG. 1, the content editing device 100 includes a processor 124, a memory 126, an interconnection mechanism 128, one or more interfaces 130, a content editing program 106, and a healing component 108.

As illustrated in FIG. 1, the content editing device 100 includes a suite of components that are standard for a programmable device. These components are the processor 124, the memory 126, the interconnection mechanism 128, and the interfaces 130. The particular manufacturer and model of any standard component may vary between the embodiments disclosed herein.

The interfaces 130 include one or more physical interface devices such as input devices, output devices, and combination input/output devices and a software stack configured to drive operation of the devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 128 is a communication coupling between the processor 124, the memory 126, and the interfaces 130. The interconnection mechanism 128 may include one or more physical busses in conformance with specialized or standard computing bus technologies such as IDE, SCSI, PCI, and InfiniBand. The interconnection mechanism 128 enables communications, including instructions and data, to be exchanged between the processor 124, the memory 126, and the interfaces 130.

The memory 126 includes readable and/or writeable data storage that stores programs and data used or manipulated during operation of a programmable device. The programs stored in the memory 126 are a series of instructions that are executable by the processor 124. The memory 126 may include relatively high performance data storage, such as registers, caches, dynamic random access memory, and static memory. The memory 126 may further include a relatively low performance, non-volatile data storage medium such as flash memory or an optical or magnetic disk. Various embodiments may organize the memory 126 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processor 124 executes a series of instructions (i.e., one or more programs) that result in manipulated data. The processor 124 may be any type of processor, multiprocessor, microprocessor, or controller known in the art. The processor 124 is connected to and communicates data with the memory 126 and the interfaces 130 via the interconnection mechanism 128. In operation, the processor 124 causes data to be read from a non-volatile (i.e., non-transitory) data storage medium in the memory 126 and written to high performance data storage. The processor 124 manipulates the data within the high performance data storage, and copies the manipulated data to the data storage medium after processing is completed.

Figure 2:
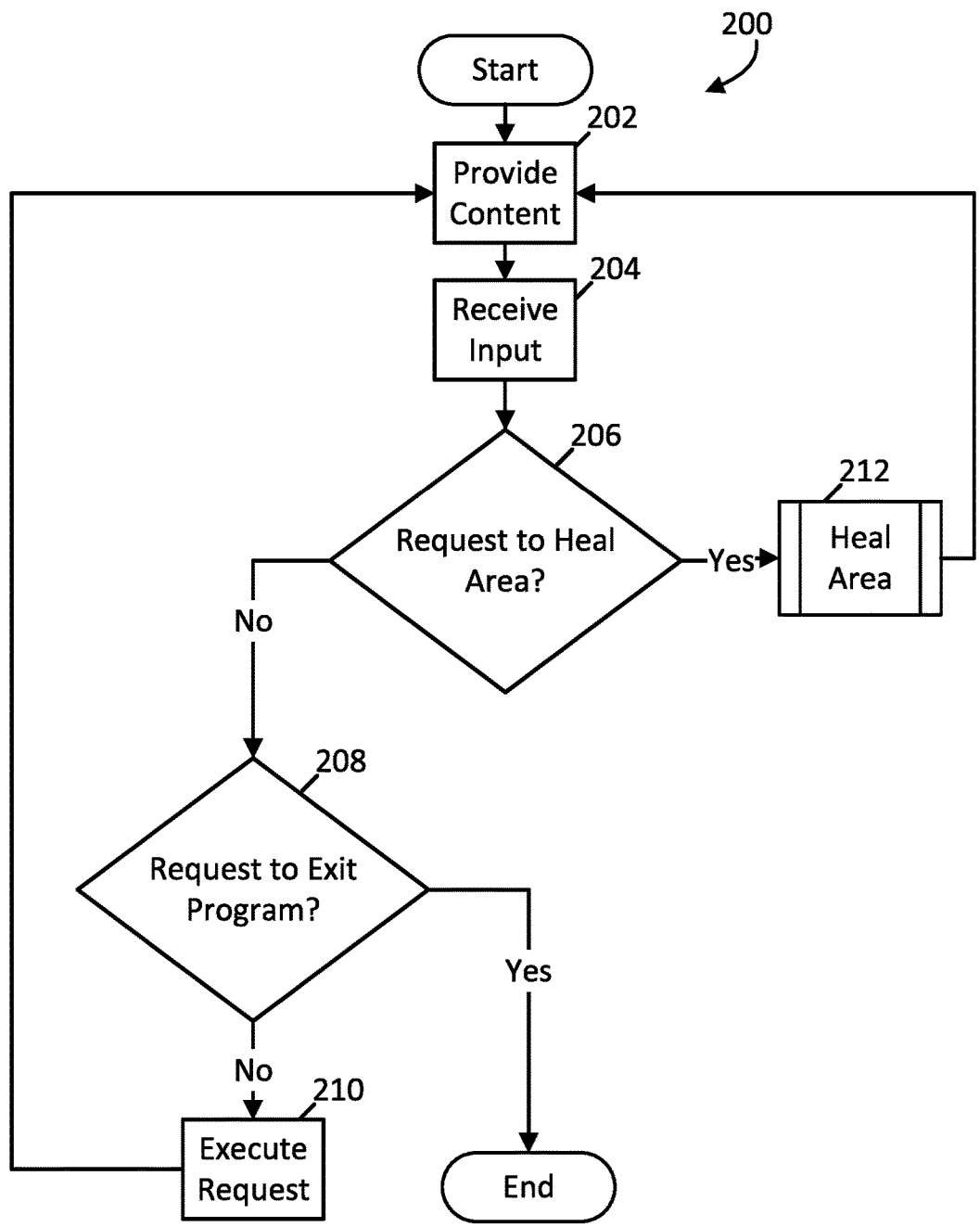
FIG. 2 is a flowchart illustrating an example content editing process in accordance with one or more embodiments of the present disclosure.

The processor 124 may be implemented with a general purpose processor. However, when executing a specific software process as provided herein (e.g., FIGS. 2 and 3), the processor 124 becomes a special purpose processor capable of making specific logic-based determinations based on input data received, and further capable of providing one or more outputs that can be used to control or otherwise inform subsequent processing to be carried out by the processor 124 and/or other processors or circuitry with which processor 124 is communicatively coupled. Thus, the processor 124 reacts to specific input stimulus in a specific way and generates a corresponding output based on that input stimulus. In this sense, the structure of processor 124 according to one embodiment is defined by the flow charts shown in FIGS. 2 and 3. In some example cases, the processor 124 proceeds through a sequence of logical transitions in which various internal register states and/or other bit cell states internal or external to the processor 124 may be set to logic high or logic low. This specific sequence of logic transitions is determined by the state of electrical input signals to the processor 124 and a special-purpose structure is effectively assumed by the processor 124 when executing each software instruction of the software process shown in FIGS. 2 and 3. Specifically, those instructions anticipate the various stimulus to be received and change the implicated memory states accordingly. In this way, the processor 124 may generate and store or otherwise provide useful output signals. Thus, it is appreciated that the processor 124, during execution of a software process becomes a special purpose machine, capable of processing only specific input signals and rendering specific output signals based on the one or more logic operations performed during execution of each software instruction. As referred to herein, the processor 124 is configured to execute a function where software is stored in a data store coupled to the processor 124 that is configured to cause the processor to proceed through a sequence of various logic decisions that result in the function being executed.

In addition to the standard suite of components described above, the content editing device 100 includes customized components. For example, as shown in FIG. 1, these customized components include the content editing program 106 and the healing component 108.

In some embodiments, the processor 124 is configured to implement the content editing program 106. The content editing program 106 may be any of a variety of different computer programs, such as applications, operating system components, and so forth. In some embodiments, the content editing program 106 is an image editing program configured to capture, edit, or otherwise manipulate data descriptive of one or more images. The content editing program 106 may alternatively be other types of programs, such as a video editing program configured to capture, edit, or otherwise manipulate data descriptive of video (e.g., multiple image frames). When executing according to its configuration, the content editing program 106 receives user input that identifies various actions to be executed on the data such as by adding to the data, removing parts of the data, modifying parts of the data, and so forth. In this way, lines, patterns, or shapes may be added, opacity of images may be increased or decreased, colors may be changed, various other filters may be applied to change the appearance of images, and so forth. The particular actions that may be executed vary based on the particular content editing program 106. In at least one embodiment, when executing in accordance with its configuration, the content editing program 106 executes a content editing process, such as the content editing process 200 described further below with reference to FIG. 2.

In some embodiments, the content editing program 106 is configured to initiate execution of the healing component 108 in response to receiving user input requesting an area of an image be composited with another area of an image. In some embodiments, the healing component 108 is configured to identify an area to be composited, determine differences between the area to be composited and a reference area (e.g., a set of foreground pixels), and modify the area to be composited to seamlessly incorporate the determined differences. In at least one embodiment, when executing according to its configuration, the healing component 108 executes an image healing process described further below with reference to FIGS. 2 and 3.

In some embodiments, the components disclosed herein may create, read, update, and delete parameters that affect the functions performed by the components. These parameters may be physically stored in any form of suitable memory including volatile memory or non-volatile memory. In addition, the parameters may be logically stored in a propriety data structure (such as a database or file defined by a user space application) or in a commonly shared data structure (such as an application registry that is defined by an operating system). In addition, some examples provide for both system and user interface components that allow external entities to modify the parameters and thereby configure the behavior of the components.

Although an embodiment implementing particular functionality is discussed herein with reference to particular components, it should be noted that, in other embodiments, the functionality of individual components can be separated into multiple components, and/or at least some functionality of multiple components can be combined into a single component. Information may flow between the any of the components described herein using a variety of techniques. Such techniques include, for example, passing the information over a network using standard protocols, such as TCP/IP or HTTP or HTTPS, and passing the information between components via data structures written in shared volatile or non-volatile memory. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Although the content editing device 100 is shown by way of example as a type of programmable device capable of executing the processes disclosed herein, embodiments are not limited to being implemented on the programmable devices shown in FIG. 1. Various processes may be practiced on one or more programmable devices having a different architectures or components than those shown in FIG. 1. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a programmable device as disclosed herein may be implemented in software, hardware, firmware, or any combination thereof.

As described above, some embodiments execute content editing processes. For example, in at least one embodiment, the content editing device 100 implements the content editing program 106 which, in turn, executes a content editing process 200 illustrated in FIG. 2.

The content editing process 200 begins with act 202 where the content editing program provides content to a user. This content may include, for example, an image (e.g., the image of FIG. 4) provided via a user interface (e.g., within the interfaces 130). In act 204, the content editing program receives user input via the user interface. The user input may specify a request to act upon the content. In act 206, the content editing program parses the input and determines whether the input specifies a request to heal an area of the image. If the input specifies such a healing request, the content editing program implements a healing component (e.g., the healing component 108) which, in turn, executes act 212. If the input does not specify a healing request, the content editing program executes act 208.

In the act 208, the content editing program determines whether the input specifies a request to exit the content editing program. If the input specifies a request to exit the content editing program, the content editing program terminates the content editing process 200. If the input does not specify a request to exit the program, the content editing program executes act 210. In the act 210, the content editing program executes an action specified by the input.

Figure 3:
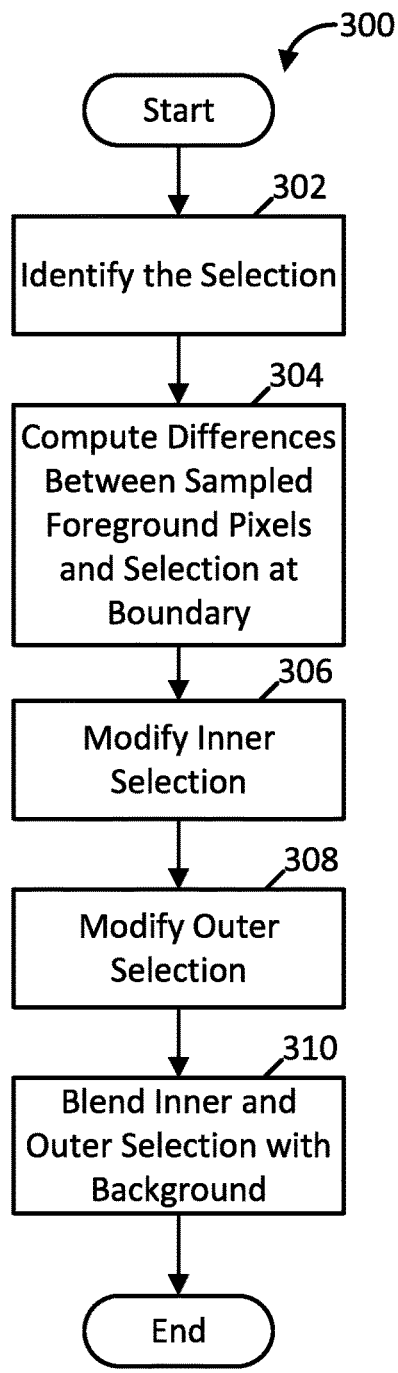
FIG. 3 is a flowchart illustrating a healing process in accordance with one or more embodiments of the present disclosure.

In act 212, the healing component heals a portion of an image by executing a healing process such as the healing process 300 described further below with reference to FIG. 3. In at least one embodiment, a content editing device (e.g., the content editing device 100) implements the healing component 108 which, in turn, executes an image healing process 300 as illustrated in FIG. 3.

The image healing process 300 begins with act 302 where a healing component (e.g., the healing component 108) parses the healing request to identify a selection within an image to be healed. This selection may include any subset of pixels in the image. For example, in at least one embodiment, the selection includes all pixels positioned within a selected area of the image. Pixels positioned within the selection may be fully or partially selected. In some embodiments, the selection may include two distinct and complementary portions: an inner selection and an outer selection. In these embodiments, the inner selection includes all pixels that have a degree of selection greater than or equal to a threshold value (e.g. 50%) and the outer selection includes the remainder of the pixels in the selection.

In some embodiments, a user interface (e.g., as may be included in the interfaces 130) displays a visual cue that depicts a boundary of the selection. This boundary may be positioned between the inner selection and the outer selection Thus, in some embodiments, the boundary and the visual cue include the same pixels. However, the embodiments disclosed herein are not limited to boundaries and visual cue sharing the same pixels or to pixels having a specific degree of selection. For instance, in other embodiments, the boundary includes pixels that are 75% selected and/or the visual cue includes pixels that are 25% selected. Still other embodiments may boundaries and visual cues with pixels having variable degrees of selection. Therefore, the embodiments disclosed herein include boundaries and visual cues having a wide a variety of pixel characteristics.

In act 304, the healing component computes differences between each pixel of the boundary and each corresponding pixel of a set of foreground pixels sampled for use in the healing process 300. In some embodiments, the set of foreground pixels is identified prior to receiving input indicating a request to heal an area. In these embodiments, the set of foreground pixels may be identified from any image accessible by the content editing device. In other embodiments, the set of foreground pixels is identified after receiving input indicating a request to heal an area. In these embodiments, the set of foreground pixels are identified from an area of the image adjacent to, or within a configurable range around, the selection.

In act 306, the healing component modifies the inner selection to seamlessly incorporate the differences computed in the act 304. In some embodiments, the healing component modifies the inner selection by executing an interpolation process. In these embodiments, the interpolation process receives the differences computed in the act 304 and modifies the pixels within the inner selection to incorporate the received differences in a smoothly varying fashion (i.e., such that the inner selection is free of visible discontinuities, edges, cracks, kinks, or other similar irregularities).

In some embodiments, to modify a set of pixels in an image to incorporate differences in a smoothly varying fashion, the interpolation process calculates a difference filter, applies the difference filter to a copy of the set of pixels, and then replaces the set of pixels in the image with the copy. It is appreciated that the interpolation process may calculate the difference filter using any of several known methods. For example, the interpolation process may solve the Poisson equation to generate the difference filter for the set of pixels using the received differences as a load function and the boundary pixel values as constraints. In this example, the boundary pixel values remain unchanged. To achieve a requisite degree of smoothness, the interpolation process may, for example, solve the Poisson equation while minimizing its second derivative. In another example, the interpolation process may execute a pyramid-based interpolation scheme to determine the difference filter using the set of pixels and the received differences as disclosed in U.S. Pat. No. 9,036,909, titled "Pyramid collapse color interpolation," issued May 19, 2015, which is hereby incorporated herein by reference in its entirety.

In the act 308, the healing component modifies the outer selection to seamlessly incorporate the differences computed in the act 304. In some embodiments, the healing component modifies the outer selection by executing the interpolation process described above with reference to the act 306, but in this instance the interpolation process receives the differences computed in the act 304 and modifies the pixels within the outer selection to incorporate the received differences in a smoothly varying fashion. Where the interpolation process described above modifies pixels in an outer selection, the interpolation process may be referred to herein as an extrapolation process. In act 310, the healing component executes an alpha blending process that blends the healed selection with the remainder of the image.

Processes in accord with the healing process 300 seamlessly composite foreground pixels with a selection in a background in a manner that prevents pixels located in the outer selection from affecting those included in the inner selection. In this way the healing process 300 prevents pixels in the outer selection from adversely impacting pixels in the inner selection.

Figure 4:
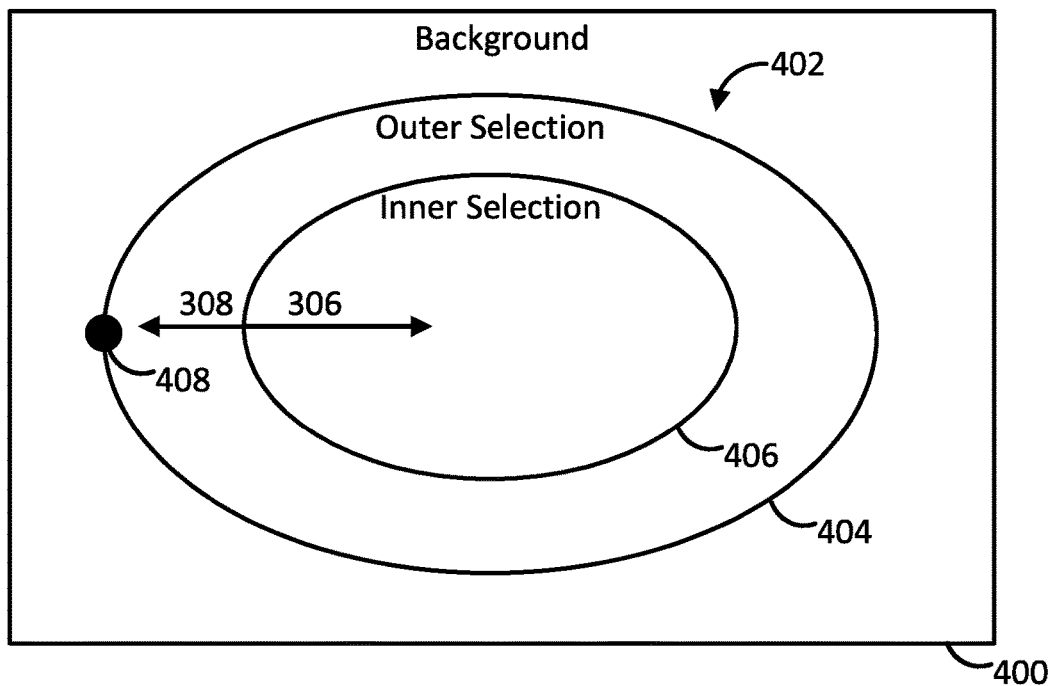
FIG. 4 is an illustration of an image being retouched by a healing component in accordance with one or more embodiments of the present disclosure.

A particular example in accord with various embodiments will now be described with reference to FIG. 4. FIG. 4 illustrates portions of an image that are processed during execution of a content editing process (e.g., the content editing process 200) by a content editing device (e.g., the content editing device 100). More specifically, the image illustrated in FIG. 4 includes a background 400 and a selection 402. The selection 402 includes an outer selection 404 and an inner selection 406. As shown in FIG. 4, the outer selection 404 includes a high contrast area 408. The high contract area 408 has a chromaticity that is substantially different from the chromaticity of the remainder of the pixels in the selection.

According to this example, a user (e.g., the user 102) enters input that specifies a request to edit the image. In response to receiving this input, the content editing device parses the input, executes a content editing program (e.g., the content editing program 106), and passes an identifier of the image illustrated in FIG. 4 to the content editing program.

The content editing program executes the act 202 to provide the image illustrated in FIG. 4 to the user via a user interface (e.g., within the interfaces 130). The content editing program executes the act 204 to receive input from the user that specifies a request to heal the selection 402. The content editing program executes the act 206 to parse the input and identify the request as a healing request. The content editing program also initiates, during execution of the act 206, a healing component (e.g., the healing component 108) in response to identifying the request as a healing request.

Continuing this example, the healing component executes the act 212 to heal the selection 402. Within the act 212, the healing component executes a healing process (e.g., the healing process 300). The healing component executes the act 302 to identify the selection 402 as the selected area to be healed. For example, the selection 402 may be part of an area previously selected by the user. The healing component next executes the act 304 to compute differences between the foreground pixels and the pixels of the background 400 at a boundary between the inner selection 406 and the outer selection 404. The healing component next executes the act 306 to modify the inner selection 406 to seamlessly incorporate the differences throughout the inner selection 406. The healing component next executes the act 308 to seamless incorporate the differences throughout the outer selection 404. Note that, in this way, the healing component prevents the high contrast area 408 from affecting pixels within the inner selection 406. The healing component concludes by executing an alpha blending process that blends the healed selection with the background 400.

As illustrated by this example, a healing component (e.g., the healing component 108) that executes a healing process (e.g., the healing process 300) seamlessly composites foreground pixels with backgrounds to yield a result that is more intuitive than conventional components. For example, a healing component according to the present disclosure prevents high contrast areas (e.g., the high contrast area 408) located in relatively under selected locations (e.g., locations less than 50% selected) from affecting the overall composite in a non-intuitive fashion.

Each of the processes described herein depict one particular sequence of acts in a particular example. The acts included in these processes may be performed by, or using, one or more programmable devices specially configured as discussed herein. Some acts are optional and, as such, may be omitted in accord with one or more examples. Additionally, the order of acts can be altered, or other acts can be added, without departing from the scope of the embodiments discussed herein. Furthermore, as discussed above, in at least one example, the acts are performed on a particular, specially configured machine, namely a content editing device configured according to the examples and embodiments disclosed herein.

Further Example Embodiments

According to one embodiment, a content editing device is provided. The content editing device includes memory and at least one processor coupled to the memory. The at least one processor is configured to receive a request to reduce transitions in a set of pixels within a background, each pixel in the set of pixels being at least partially selected and at least one pixel in the set of pixels being partially selected; and in response to receipt of the request: identify a first portion of the set; identify a second portion of the set distinct from the first portion and including the at least one pixel; reduce transitions in the first portion, separately from the second portion, using one or more foreground pixels; reduce transitions in the second portion, separately from the first portion, using the one or more foreground pixels; and blend the set of pixels with the background.

In the device, the first portion may include pixels that have a degree of selection greater than or equal to a threshold value. The threshold value may equal 50%.

The device may further includes a user interface executable by the at least one processor. The at least one processor may be further configured to provide, via the user interface, a visual cue of the set of selected pixels, the visual cue including pixels in a boundary between the first potion and the second portion. The at least one processor may be further configured to provide, via the user interface, a visual cue of the set of selected pixels, the visual cue including pixels in a boundary between the first potion and the second portion.

In the device, the at least one processor may be further configured to automatically sample the one or more foreground pixels after identifying the set of selected pixels. The at least one processor may be configured to reduce transitions in the first portion at least in part by computing differences between the one or more foreground pixels and pixels in a boundary between the first potion and the second portion and modifying the first portion based on the differences. The at least one processor may be configured to reduce transitions in the second portion at least in part by modifying the second portion based on the differences. The at least one processor may be configured to modify the first portion at least in part by executing an interpolation process on the first portion using the differences and modify the second portion at least in part by executing an extrapolation process on the second portion using the differences.

According to another embodiment, a method of editing content using a content editing device is provided. The content editing device includes memory and at least one processor. The method includes acts of receiving a request to reduce transitions in a set of pixels within a background, each pixel in the set of pixels being at least partially selected and at least one pixel in the set of pixels being partially selected; and in response to receiving the request: identifying a first portion of the set; identifying a second portion of the set distinct from the first portion and including the at least one pixel; reducing transitions in the first portion, separately from the second portion, using one or more foreground pixels; reducing transitions in the second portion, separately from the first portion, using one or more foreground pixels; and blending the set of pixels with the background.

In the method, the act of identifying the first portion may include an act of identifying pixels having a degree of selection greater than or equal to a threshold value. The act of identifying pixels may include an act of identifying pixels having a degree of selection greater than or equal to 50%.

The content editing device may further include a user interface coupled to the at least one processor. The method may further include an act of providing, via the user interface, a visual cue of the set of selected pixels, the visual cue including pixels in a boundary between the first potion and the second portion. The method may further include an act of automatically sampling the one or more foreground pixels after identifying the set of selected pixels.

In the method, the act of reducing transitions in the first portion may include acts of computing differences between the one or more foreground pixels and pixels in a boundary between the first potion and the second portion and modifying the first portion based on the differences. The act of reducing transitions in the second portion may include an act of modifying the second portion based on the differences. The act of modifying the first portion may include an act of executing an interpolation process on the first portion using the differences and the act of modifying the second portion may include an act of executing an extrapolation process on the second portion using the differences.

According to another embodiment, a non-transitory data storage medium is provided. The data storage medium storing instructions executable by a programmable device. The instructions are configured to execute a method of editing content. The method includes acts of receiving a request to reduce transitions in a set of pixels within a background, each pixel in the set of pixels being at least partially selected and at least one pixel in the set of pixels being partially selected; and in response to receiving the request: identifying a first portion of the set; identifying a second portion of the set distinct from the first portion and including the at least one pixel; reducing transitions in the first portion, separately from the second portion, using one or more foreground pixels; reducing transitions in the second portion, separately from the first portion, using one or more foreground pixels; and blending the set of pixels with the background.

The instructions may be configured to execute a method that further comprises an act of automatically sampling the one or more foreground pixels after identifying the set of selected pixels. The instructions may be configured to execute a method in which the act of reducing transitions in the first portion with the sampled image data includes acts of computing differences between the one or more foreground pixels and pixels in a boundary between the first potion and the second portion and modifying the first portion based on the differences. The instructions may be configured to execute a method in which the act of reducing transitions in the second portion comprises an act of modifying the second portion based on the differences. The instructions may be configured to execute a method in which the act of modifying the first portion comprises an act of executing an interpolation process on the first portion using the differences and the act of modifying the second portion comprises an act of executing an extrapolation process on the second portion using the differences.

Having thus described several aspects of at least one embodiment, it is to be appreciated that various alterations, modifications, and improvements will readily occur to those skilled in the art. For instance, embodiments disclosed herein may also be used in other contexts wherein the recordings include both audio and video data. Such alterations, modifications, and improvements are intended to be part of this disclosure, and are intended to be within the scope of the embodiments discussed herein. Accordingly, the foregoing description and drawings are by way of example only.

What is claimed is:

1. A content editing device comprising:
   memory; and
   at least one processor coupled to the memory and configured to:
   receive a request to reduce transitions in a set of pixels within a background, each pixel in the set of pixels being at least partially selected and at least one pixel in the set of pixels being partially selected;
   in response to receipt of the request:
      identify a first portion of the set;
      identify a second portion of the set distinct from the first portion and comprising the at least one pixel;
      reduce transitions in the first portion, separately from the second portion, using one or more foreground pixels at least in part by:
         computing differences between the one or more foreground pixels and pixels in a boundary between the first portion and the second portion; and
         modifying the first portion based on the differences at least in part by executing an interpolation process on the first portion using the differences;
      reduce transitions in the second portion, separately from the first portion, using the one or more foreground pixels at least in part by:
         modifying the second portion based on the differences at least in part by executing an extrapolation process on the second portion using the differences; and
      blend the set of pixels with the background.

2. The device of claim 1, wherein the first portion comprises pixels that have a degree of selection greater than or equal to 50%.

3. The device of claim 1, wherein the at least one processor is configured to blend the set of pixels with the background at least in part by executing an alpha blending process.

4. The device of claim 1, further comprising a user interface executable by the at least one processor, wherein the at least one processor is further configured to provide, via the user interface, a visual cue of the set of pixels.

5. The device of claim 4, wherein the visual cue comprises pixels in the boundary.

6. The device of claim 4, wherein the visual cue comprises pixels distinct from pixels in the boundary.

7. The device of claim 1, wherein the at least one processor is further configured to automatically sample the one or more foreground pixels after identifying the set of pixels.

8. A method of editing content using a content editing device comprising memory and at least one processor, the method comprising:
   receiving a request to reduce transitions in a set of pixels within a background, each pixel in the set of pixels being at least partially selected and at least one pixel in the set of pixels being partially selected;
   in response to receiving the request:
      identifying a first portion of the set;
      identifying a second portion of the set distinct from the first portion and comprising the at least one pixel;
      reducing transitions in the first portion, separately from the second portion, using one or more foreground pixels at least in part by:
         computing differences between the one or more foreground pixels and pixels in a boundary between the first portion and the second portion; and
         modifying the first portion based on the differences at least in part by executing an interpolation process on the first portion using the differences;
      reducing transitions in the second portion, separately from the first portion, using the one or more foreground pixels at least in part by:
         modifying the second portion based on the differences at least in part by executing an extrapolation process on the second portion using the differences; and
      blending the set of pixels with the background.

9. The method of claim 8, wherein identifying the first portion comprises identifying pixels having a degree of selection greater than or equal to 50%.

10. The method of claim 8, wherein blending the set of pixels with the background comprises executing an alpha blending process.

11. The method of claim 8, wherein the content editing device further comprises a user interface coupled to the at least one processor and the method further comprises providing, via the user interface, a visual cue of the set of pixels.

12. The method of claim 11, wherein the visual cue comprises pixels in the boundary.

13. The method of claim 11, wherein the visual cue comprises pixels distinct from pixels in the boundary.

14. The method of claim 8, further comprising automatically sampling the one or more foreground pixels after identifying the set of pixels.

15. A non-transitory data storage medium storing instructions executable by a programmable device, the instructions being configured to execute a method of editing content, the method comprising:

receiving a request to reduce transitions in a set of pixels within a background, each pixel in the set of pixels being at least partially selected and at least one pixel in the set of pixels being partially selected;

in response to receiving the request:
identifying a first portion of the set;
identifying a second portion of the set distinct from the first portion and comprising the at least one pixel;
reducing transitions in the first portion, separately from the second portion, using one or more foreground pixels at least in part by:

computing differences between the one or more foreground pixels and pixels in a boundary between the first portion and the second portion; and modifying the first portion based on the differences at least in part by executing an interpolation process on the first portion using the differences;

reducing transitions in the second portion, separately from the first portion, using the one or more foreground pixels at least in part by:

modifying the second portion based on the differences at least in part by executing an extrapolation process on the second portion using the differences; and blending the set of pixels with the background.

16. The data storage medium of claim 15, wherein identifying the first portion comprises identifying pixels having a degree of selection greater than or equal to 50%.

17. The data storage medium of claim 15, wherein the method further comprises providing, via a user interface, a visual cue of the set of pixels.

18. The data storage medium of claim 17, wherein the visual cue comprises pixels in the boundary.

19. The data storage medium of claim 17, wherein the visual cue comprises pixels distinct from pixels in the boundary.

20. The data storage medium of claim 15, wherein the method further comprises automatically sampling the one or more foreground pixels after identifying the set of pixels.

* * * * *